Figure 1:
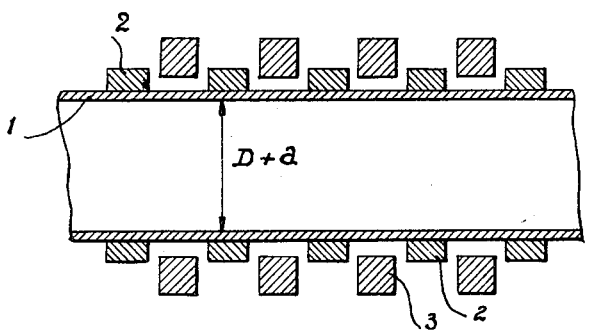

May 4, 1954 G. A. FERRAND 2,677,171
CONSTRUCTION OF HOOPED PIPELINES
Filed May 31, 1950

Inventor:
G. A. FERRAND
By: Young, Emery & Thompson
Attys.

Patented May 4, 1954

2,677,171

UNITED STATES PATENT OFFICE 2,677,171

CONSTRUCTION OF HOOPED PIPELINES

Georges A. Ferrand, Grenoble, France

Application May 31, 1950, Serial No. 165,349

Claims priority, application France July 26, 1949

3 Claims. (Cl. 29—148.2)

This invention relates to improvements in the fabrication of hooped pipelines.

In the art of pipeline manufacture, as also in that of the construction of tanks and all containers that are to withstand high internal pressures in service, it has been known for many years to use hooped cylindrical elements. Thus hooped pipes have for some time about completely replaced welded pipes in the construction of pressure pipelines, as the use of hoops enables the construction of pipe elements having a considerable thickness and provides at the same time a substantial economy in the amount of metal used.

Formerly the hoops were mounted hot, the hooping process involving a preliminary heating of the hoops to expand them and then placing them around the pipe so that, when cool, they contract about the pipe and grip it under a strong pressure.

An important subsequent development was provided by the cold self-hooping process, described for instance in the British patent specifications 269,342 granted June 23, 1927, and 340,-148 granted February 1, 1929. In this method, the hoops are made slightly wider than the pipe and are mounted on the latter while cold. Then sufficient pressure is applied within the pipe to exceed its elastic limit and impart to it a permanent set. In this procedure, the pipe expands while cold and becomes applied against the hoops which become integrally bonded to it while acquiring an elastic stretch.

Another process used involves applying a cold-hooping operation to a preliminarily over-pressurized pipe, that is, a pipe to which a permanent set was imparted in the cold by the application to it of a suitable internal pressure while it is maintained in a mould. This process can be applied in two steps, first an over-pressurizing step proper (cf. French Patent 831,867 granted April 19, 1937) followed by a self-hooping step similar to that outlined above. It can also however be carried out in a single operation involving simultaneous over-pressurizing and self-hooping, as described in my co-pending patent application for "Improvements relating to the construction of structural elements that are to be stressed under high internal pressure," filed concurrently herewith.

Any of these cold-hooping processes constitutes a noteworthy improvement over the old hot hooping process. Essentially they provide for an improved utilization of the metal and afford a corresponding substantial economy in the amount of metal having to be used.

It is to be noted that in all of these methods, while the advantageous result just stated is obtained by imparting to the pipe wall a permanent set, care is taken not to exceed the elastic limit of the hoops. Indeed it is always endeavoured to remain well within the elastic limit of the hoops which are thus exclusively subjected to elastic strains.

My present invention provides, in the construction of hooped pressure pipelines and similar elements, the step which comprises increasing not only the elastic limit of the pipe wall, but also that of the hoops themselves, by subjecting said hoops to a cold-drawing effect.

Such increase in the elastic limit of the hoops is consistent with the characteristics of steel of the grades now available. The special and sectional steels now supplied by the steel mills are capable of undergoing a cold drawing treatment with permanent deformation, without this treatment interfering with any of their characteristics and, more particularly, preserving the necessary degree of resiliency adequate and sufficient for the conditions to be fulfilled.

Owing to the deformation to which the hoops are subjected, it becomes possible substantially to increase the deformation of the skin or wall pipe element about which they are secured. It is possible to attain in the wall pipe element the maximum degree of elongation prior to striction, that is, corresponding to the peak of the elongation curve.

This method makes it possible to impart to the metal of the wall a higher degree of cold-working than obtained in the conventional self-hooping process or in the combination self-hooping and preliminary or simultaneous over-pressurizing operation. The increase in the elastic limit of the hoops augments the elongation of the pipe wall by the safety factor provided by the hoops not only on account of their presence but also due to the increase in their inherent mechanical characteristics. Conversely, under given working conditions, the metal is used more efficiently, thus reducing the weight of metal to be used and the cost of the construction.

A further advantage of the method of the invention is that the resulting hooped pipeline possesses a safety factor which, instead of being a theoretical and calculated one, is a true and effective safety factor, bearing an effective controlled relation with the actual elastic limit of the constituent materials used.

In qualification of the above, it is known that ordinary hooped pipes designed for use in pressure lines are generally so calculated that the maximum application of a pressure 2.5 times the maximum working pressure will cause within the hoops a fatigue or strain not greater than the elastic limit of the metal of which they are made. This is what is meant when it is said that the safety factor is 2.5 under the maximum working pressure.

When the conventional self-hooping process is used the pipe is generally subjected to twice its maximum working pressure. This pressure stresses the pipe wall above its elastic limit. The elastic limit of the hoops however is far from being attained. Accordingly, if the pipes have a calculated safety factor of 2.5, their actual or controlled safety factor is only 2.

Applying method of the invention, that is stressing the hoops to above their elastic limit, involves subjecting the pipe during its manufacture to a pressure higher than that developed in the prior methods, and which can reach three times the maximum working pressure. The resulting pipes are therefore tested at 3 times the maximum service pressure and they effectively and inherently possess a safety factor of 3. Thus such pipes, when designed with the safety factor normally applied in the art, viz. 2.5, are actually capable of withstanding a working pressure $3:2.5=1.2$ times higher than the conventional hooped pipes.

This provides the possibility of either counting on a higher safety factor for a given weight of metal, or reducing the amount of metal used while retaining a given safety factor.

It is to be observed moreover that the reduction in the weight of metal mainly concerns the hoops, which are made of the more expensive metal so that a very appreciable saving is achieved.

Thus, the invention provides a method of rendering existent hooped pipes capable of withstanding a higher pressure than those for which they were designed, said method consisting of subjecting them to a cold-drawing operation which exceeds the elastic limit of the hoops and substantially increases it (at the same time as it further increases the elastic limit of the pipe skin).

This increase in the elastic limit of the hoops may be applied to any hooped pipe no matter what particular process was used in hooping it. It can both be foreseen in the fabrication of new pipes and performed on existent hooped pipes. It can be used with hot hooped pipes. It is particularly advantageous however in connection with cold self-hooped pipes or self-hooped and over pressurized pipes.

In its use in conjunction with the cold self-hooping process, it is merely necessary to provide the suitable clearance between the walls and the hoops to obtain a suitable distribution of the elongations in the walls and in the hoops. This distribution is so predetermined that the respective elongations of the pipe wall and the hoops will correspond substantially to incipient striction in the metals from which they are made, the overall elongation being the sum total of the elongation due to the initial cold-working of the walls and the elongation in the hoops, in the event the operation is applied to a pipe already hooped and where consequently a double operation is performed, while, where a single operation is carried out, the over-all elongation will correspond only to that due to the cold-working of the pipe wall.

In practice, the elastic limit of the hoops may be achieved through the use of a special operation performed on a preliminarily self-hooped pipe. However, it can also be obtained in a single operation which both accomplishes the self-hooping and stretches the hoops.

Figure 2:
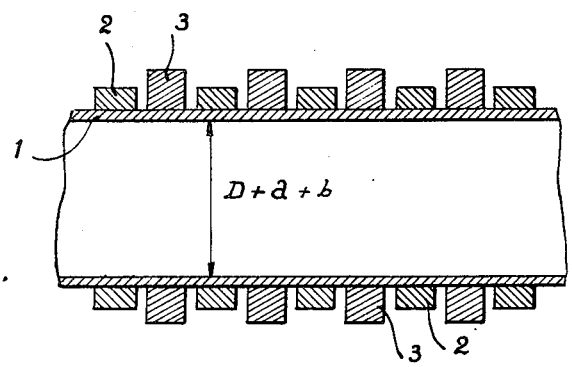

The practical procedures embodying the invention are exemplified in the accompanying drawings in which:

Figs. 1 and 2 relate to the process involving a double operation and

Figure 3:
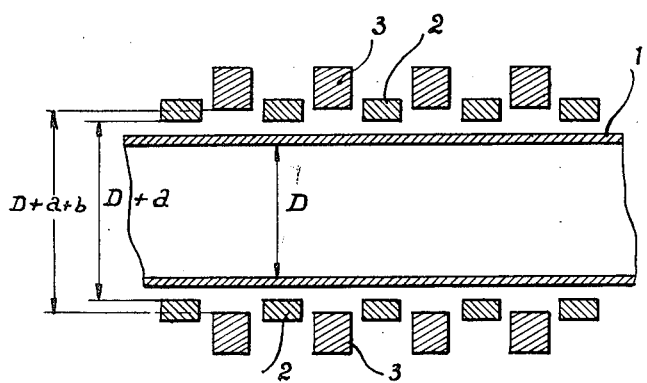
Figure 4:
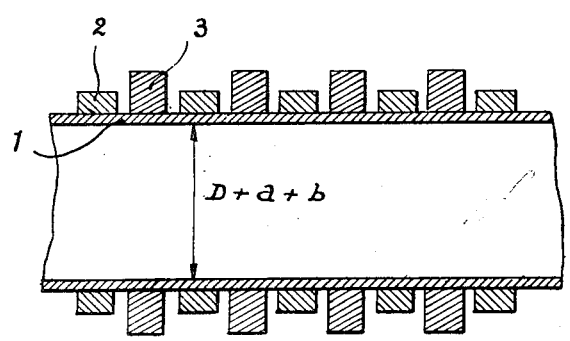

Figs. 3 and 4 relate to the single-step method.

As shown in Fig. 1 the pipe to be treated is already in self-hooped condition, so that the wall 1 was, in an initial self-hooping operation, cold-worked so as to become applied under elastic tension against the hoops 2. Owing to this operation the pipe has expanded from its original diameter $D$ to its present diameter $D+a$.

Between the hoops 2 rings 3 made up of two or more sections are inserted, said rings having an internal diameter corresponding to the elongation $b$ which it is desired to impart to the hoops 2, that is, the initial inner diameter of the hoops plus $b$.

After the rings 3 have been put into place, the whole structure is mounted between the plates of an hydraulic testing press, and the proper seals are provided between the pipe ends and the plates. Then the pipe is gradually put under pressure up to a final pressure as high as or higher than 2.5 times the service pressure (static pressure+the overload pressure the pipeline may have to withstand).

Under the increasing pressure the wall 1 stretches, stretching the hoops 2 and generating in the latter increasingly high strains which finally exceed the elastic limit. The hoops stretch until the outer wall 1 contacts the rings 3 (Fig. 2) which thus limit the elongation of the hoops to the predetermined value.

The operation is then completed. The pressure is brought down to zero, and the rings 3 removed. The hooped pipe retains the shape assumed by it at the end of the process, that is, it has become deformed to a diameter $D+a+b$.

In the form of procedure shown in Figs. 3 and 4, the pipe to which the process is applied is a drawn or welded pipe 1 having a diameter D. About this pipe hoops 2 are placed. The inner diameter of these hoops, instead of being selected so as to provide strictly the clearance necessary for mounting the hoops, as in the conventional self-hooping process, is so predetermined as to provide a clearance $a$ corresponding to the partial elongation of the wall 1. Then, between the hoops 2 rings 3 made of one or more parts are interposed, said rings having an inner diameter $D+a+b$, the amount $b$ corresponding to the elongation which is to be assumed by the hoops 2.

The resulting structure is mounted on the press and subjected to increasing pressure. The wall 1 is first deformed to contact the hoops 2. Then as the pressure further increases, elongation of the hoops 2 sets in. The total elongation $a+b$ is thus obtained in a single-step operation.

Instead of using rings 3 interposed between the hoops 2 and engaging the pipe wall 1, a continuous tube may be used, in one or more sections, corresponding in internal diameter to the final outer diameter of the hoops 2 after the increase in their elastic limit. This tube is mounted around the hoops 2 and restricts their expansion from outside.

The method of the invention is generally used with rigid hoops. However, it is applicable with flexible hoops, both of the type consisting of slings or rings made of wire cable, and of that consisting of strips wound in successive lays, or further with hoops consisting of a cable helically wound about the pipe.

*Example*

A self-hooped pipe is to be provided in which the walls and the hoops have their elastic limits raised in the cold according to the invention, said pipe having an inner diameter of 5'3" and being designed to withstand a working pressure of 1715 p. s. i.

The wall or skin pipe element is made of high grade weldable chromium-copper steel sheeting having the following characteristics:

Tensile ⩾32.2 t. s. i.
Elastic limit⩾21.6
Elongation⩾20%

.71" thick and prepared for a 7% elongation with an initial diameter of 4'11.05".

The hoops are of special chromium-nickel steel rolled and treated for the following characteristics:

Tensile ⩾72.0 t. s. i.
Elastic limit⩾59.2
Elongation⩾6%

3.04" wide, 1" thick and spaced by 3.04" intervals, prepared for a 2% stretch with an inner diameter of 5'3.236".

The element thus prepared is mounted as described between the plates of an hydraulic testing press and subjected to an internal pressure of 4300 p. s. i.

During the gradual application of this pressure, the pipe expands 7%, stretching the hoops until the latter have assumed an elongation of 2%. After the pressure has been removed the hoops remain highly stretched and the wall strongly compressed.

The mean thickness of this pipe, hoops inclusive, is 1.2".

An ordinary self-hooped pipe in which both the sheeting and the hoops are made from the same grades of steel and destined to withstand the same working pressure would be hooped and tested under a pressure of 3430 p. s. i. and its mean thickness would be 1.457" with the same wall thickness of 0.71" and hoops having the same width and spacing (3.04") but with a thickness of 1½".

The saving in weight thus provided is 21% with respect to the prior methods, and this saving is entirely effected on the hoops, made of more expensive material than the skin.

A hooped pipe according to the invention, if designed with a theoretical safety factor of 2.5 is constructed with an effective and checked safety factor of 2.5, since the pressure to which it was subjected was 2.5 times the working pressure, whereas the ordinary hooped pipe designed with the same theoretical safety factor, can only be subjected to a pressure twice its working pressure.

What I claim is:

1. A method for producing hooped steel conduits, wherein the hooping means are made of steel, the elongation of which is less than and the tensional strength of which is greater than that of the steel forming the conduit wall, said method consisting in arranging a plurality of independent hooping means round the conduit with a predetermined radial clearance between them and the conduit, said clearance being such as will allow an expansion of the conduit to an extent corresponding to a predetermined permanent deformation, inserting in the intervals between the different hooping means disconnectable parts surrounding the conduit wall and spaced with reference to the latter by a predetermined amount of radial clearance such as will allow a permanent deformation of the hooping means submitted to the radial stresses exerted by the conduit when expanding with the said hooping means, applying pressure inside the conduit until the outer surface of its expanding wall, after deforming radially the hooping means, engages the inner surface of the disconnectable parts, cutting out the pressure and disconnecting and removing the disconnectable parts.

2. A method for producing hooped steel conduits, wherein the hooping means are made of steel, the elongation of which is less than and the tensional strength of which is greater than that of the steel forming the conduit wall, said method consisting in arranging a plurality of independent hooping means round the conduit with a predetermined radial clearance between them and the conduit, said clearance being such as will allow an expansion of the conduit wall to an extent corresponding to a predetermined permanent deformation by about 7%, applying pressure inside the pipe until the expanding pipe wall engages the hooping means while assuming the said predetermined permanent deformation, inserting in the intervals between the different hooping means disconnectable parts surrounding the conduit wall and spaced with reference to the latter by a predetermined amount of radial clearance such as will allow a permanent deformation of the hooping means submitted to the radial stresses exerted by the conduit when expanding with the said hooping means, applying pressure inside the conduit until the outer surface of its expanding wall, after deforming radially the hooping means, engages the inner surface of the disconnectable parts, cutting out the pressure and disconnecting and removing the disconnectable parts.

3. A method for producing hooped steel conduits, wherein the hooping means are made of steel, the elongation of which is less than and the tensional strength of which is greated than that of the steel forming the conduit wall, said method consisting in arranging a plurality of independent hooping means round the conduit with a predetermined radial clearance between them and the conduit, said clearance being such as will allow an expansion of the conduit to an extent corresponding to a predetermined permanent deformation, inserting in the intervals between the different hooping means disconnectable parts surrounding the conduit wall and spaced with reference to the latter by a predetermined amount of radial clearance such as will allow the conduit wall and the hooping means to assume an elongation corresponding to incipient striction under the action of the radial stresses to which is submitted the system constituted by the conduit when expanding with the hooping means, applying pressure inside the conduit until the outer surface of its expanding wall, after deforming radially the hooping means, engages the inner surface of the disconnectable parts, cutting out the pressure and disconnecting and removing the disconnectable parts.

References Cited in the file of this patent

UNITED STATES PATENTS

| Number | Name | Date |
|---|---|---|
| 1,696,725 | Murray | Dec. 25, 1928 |
| 1,733,455 | Ferrand | Oct. 29, 1929 |
| 1,763,360 | Kean | June 10, 1930 |
| 2,337,247 | Kepler | Dec. 21, 1943 |
| 2,425,800 | Hamilton, Jr. | Aug. 19, 1947 |

FOREIGN PATENTS

| Number | Country | Date |
|---|---|---|
| 683,836 | France | Mar. 10, 1930 |